Oct. 14, 1924.
W. GARGAY
1,511,878
CONFECTION
Filed April 30, 1923
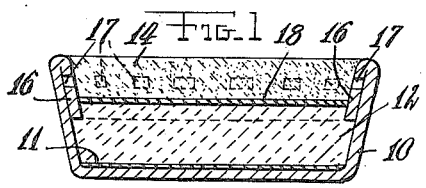
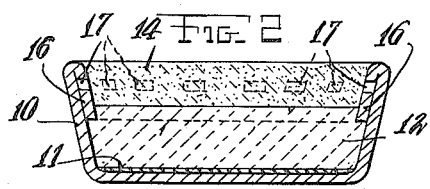
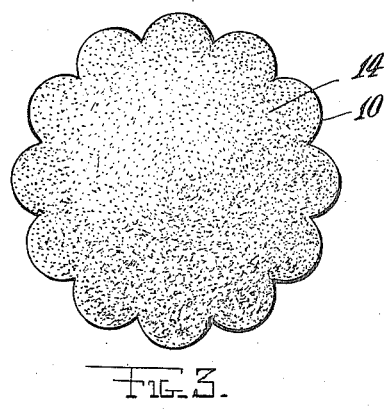
Fig. 3.
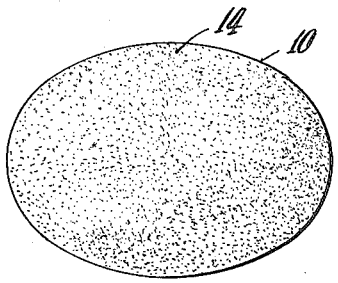
Fig. 4.
Inventor
William Gargay
By
Attorney Patented Oct. 14, 1924.

1,511,878

UNITED STATES PATENT OFFICE.

WILLIAM GARGAY, OF NEW YORK, N. Y.

CONFECTION.

Application filed April 30, 1923. Serial No. 635,642.

*To all whom it may concern:*

Be it known that I, WILLIAM GARGAY, a citizen of Hungary, residing at New York, in the county of New York and State of New York, have invented certain new and useful Improvements in Confections, of which the following is a specification.

This invention relates generally to confectionery, having more particular reference to an article of this sort comprising a filling of congealed material, such as ice cream, enclosed within a suitable protective coating.

The invention has for an object the provision of a novel article of confectionery of this type which can be quickly and easily made.

For further comprehension of the invention, and of the objects and advantages thereof, reference will be had to the following description and accompanying drawings, and to the appended claims in which the various novel features of the invention are more particularly set forth.

Fig. 1 of the drawings is a vertical sectional view showing one form of my improved confection.

Fig. 2 is a similar view but showing a slightly modified construction.

Figs. 3 and 4 are plan views showing different configurations that may be given the confection.

In constructing my improved article 1 form a suitable shallow receptacle 10 of suitable material such as is ordinarily used in making wafers, the containers for ice cream cones, or the like, and which, after being baked is crisp and possesses fair rigidity. This receptacle I line on the bottom with a coating 11 of chocolate, and it is then filled with a congealed article such as ice cream indicated at 12, with which may be mixed fruit, or fruit juices.

To seal this filling I provide a covering 14 made from the white of eggs and sugar properly beaten up, which material when subjected to the action of heat for a few seconds hardens.

In order to ensure of the retention of the filling during handling I may provide the receptacle with a downturned member 16 extending around its edge and which is formed by doubling the marginal portion of the material from which the receptacle is made upon itself. The lower edge of this member is spaced above the chocolate lining 11. In this member 16 are formed a number of openings 17 which are suitably spaced around it and are located just below the top thereof. After the filling 12 has been placed in the receptacle a wafer 18 of the same material as the receptacle is inserted in the top of the latter. The sealing element is then placed over this cover and spreads through the openings 17 and so is interlocked with the member 16 and the filling is thereby held more securely in place and is not liable to be displaced accidentally during handling of the confection. After the parts have been assembled the confection is placed in an oven for a few seconds which causes the coating 14 to set, the exposure to the heat, however, not being long enough to allow the heat to penetrate to the filling and melt the latter.

The form of the device shown in Fig. 2 is the same as that shown in Fig. 1 except that the cover 18 is omitted.

As indicated in Figs. 3 and 4 I may form my improved confection of varying outline with either plain or ornamental border.

Having thus described my invention, what I claim as new and desire to protect by Letters Patent of the United States is as follows:

1. A confection of the type described comprising a receptacle forming element of sheet-like material formed at its top edge with an overturned part forming a wall of double thickness, said overturned part having openings therein, a filling in said receptacle, and a sealing element for said filling having projections engaging in the said openings.

2. A confection comprising a receptacle forming element of sheet-like material having an overturned part forming a double wall around the upper portion of the receptacle, said part having openings therein, a filling in said receptacle, a wafer covering said filling below the said openings, and a sealing element extending over said wafer and engaging said openings.

In testimony whereof I have affixed my signature.

WILLIAM GARGAY.